United States Patent [19]

Chan

[11] 3,912,194

[45] Oct. 14, 1975

[54] TAPE CASSETTE WITH TAPE CLEARANCE SPACE

[76] Inventor: John Y. S. Chan, 24965 Huron St., Loma Linda, Calif. 92354

[22] Filed: June 21, 1974

[21] Appl. No.: 481,766

[52] U.S. Cl. .............................................. 242/199

[51] Int. Cl.$^2$ ..................G03B 1/04; G11B 15/32; G11B 23/04

[58] Field of Search ........................... 242/197–200, 242/194, 71.1, 71.2; 352/72, 78 R

[56] References Cited

UNITED STATES PATENTS

| | | | |
|---|---|---|---|
| 3,556,434 | 1/1971 | Koeppe | 242/199 |
| 3,565,367 | 2/1971 | Yamamoto | 242/199 |

*Primary Examiner*—Leonard D. Christian
*Attorney, Agent, or Firm*—Shoemaker and Mattare

[57] ABSTRACT

A tape cassette, including opposed, mating housing portions enclosing therein two spaced apart spools with a recording tape wound thereon, each housing portion having a recess therein for tape clearance in the event the tape does not wind properly upon the spools, to thus prevent binding of the tape in the cassette, and resiliently yieldable tape deflector plates in each housing portion on opposite sides of the spools of tape to urge the tape to wind accurately upon the spools.

3 Claims, 8 Drawing Figures

TAPE CASSETTE WITH TAPE CLEARANCE SPACE

BACKGROUND OF THE INVENTION

This invention relates to tape cassettes, and more particularly, to a unique housing for a tape cassette in which the housing has recessed portions therein adjacent the spools of tape in the housing for providing clearance for the tape wound on the spools to prevent binding of the tape in the housing in the event the tape is not wound accurately and flatly upon the spools.

In the prior art, tape cassettes are all of substantially the same construction, and the cassettes include mating housing portions having means therein for rotatably supporting spools in spaced apart relationship in the housing, and a recording tape is wound upon the spools and is arranged to move past an opening in an edge portion of the housing, either for recording on the tape or for playing a message previously recorded on the tape. In conventional cassettes, the spools of tape are disposed closely adjacent the inner wall surfaces of the cassette housing portions and, accordingly, if the tape does not wind properly upon the spools, it will engage the wall portions of the housing, with the result that the tape may bind in the housing.

In accordance with the present invention, the inner wall surface of the housing portions has a recessed area formed therein adjacent the tape, so that in the event the tape does not wind accurately upon the spools, it is enabled to move slightly laterally into the recess and thus prevent binding of the tape in the housing.

Additionally, resiliently yieldable tape deflector plates are provided on opposite sides of the tape in overlying relationship to the recesses to resiliently urge the tape to wind accurately upon the spools.

OBJECTS OF THE INVENTION

An object of the invention is, therefore, to provide a tape cassette which includes opposed, mating housing portions, and wherein the housing portions have recessed areas therein adjacent the tape wound upon spools in the housing, so that the tape will not bind in the housing in the event it does not wind accurately upon the spools, and further, including resiliently yieldable tape deflector plates on opposite sides of the spools of tape to urge the tape to wind accurately upon the spools.

DETAILED DESCRIPTION OF THE INVENTION

Figures 1, 2:
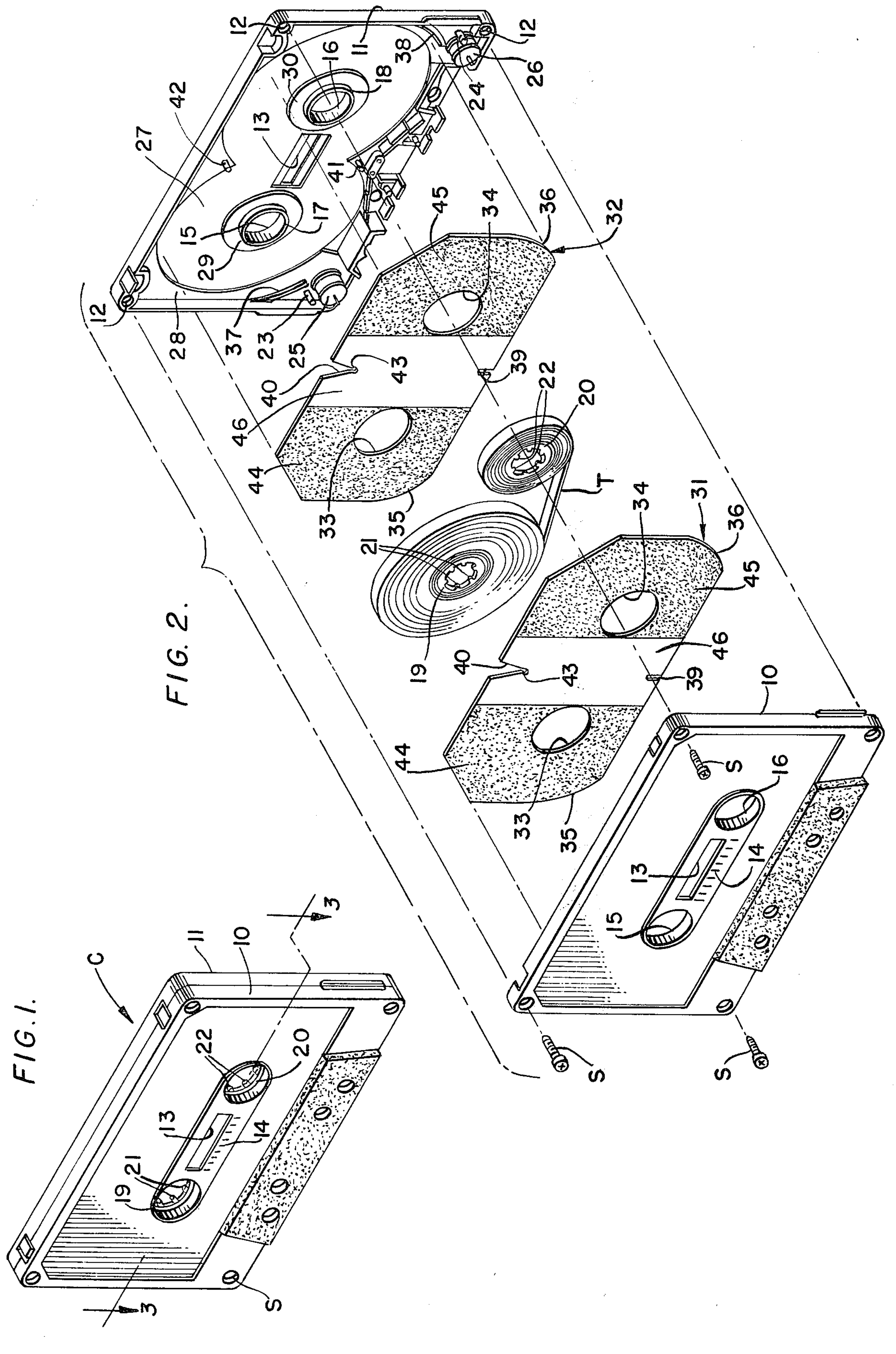
FIG. 1 is a perspective view of a tape cassette in accordance with the invention.
FIG. 2 is an enlarged, exploded, perspective view of a tape cassette in accordance with the invention.
Figure 3:
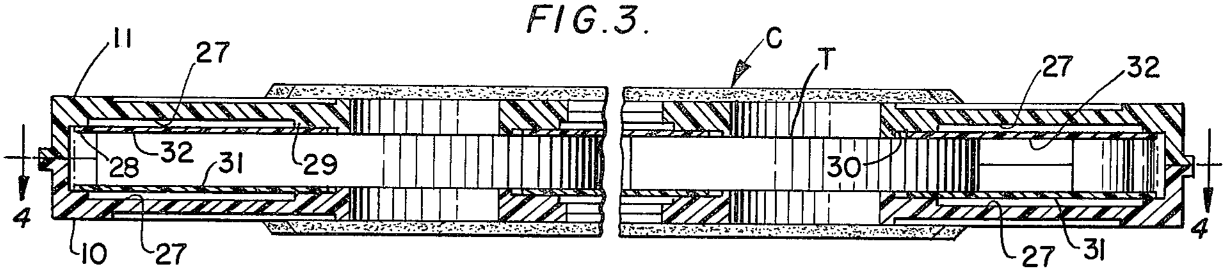
FIG. 3 is an enlarged view in section taken along line 3—3 in FIG. 1, and with a portion thereof broken away.
Figure 4:
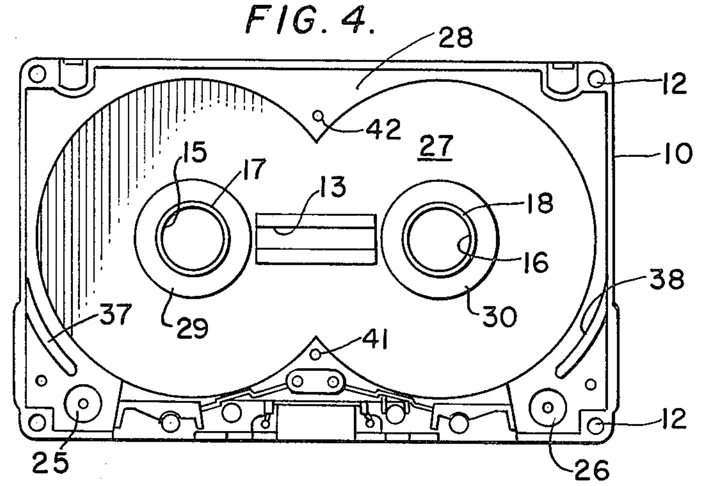
FIG. 4 is a view in section taken along line 4—4 in FIG. 3, showing the inner surface of one of the housing portions.
Figure 5:
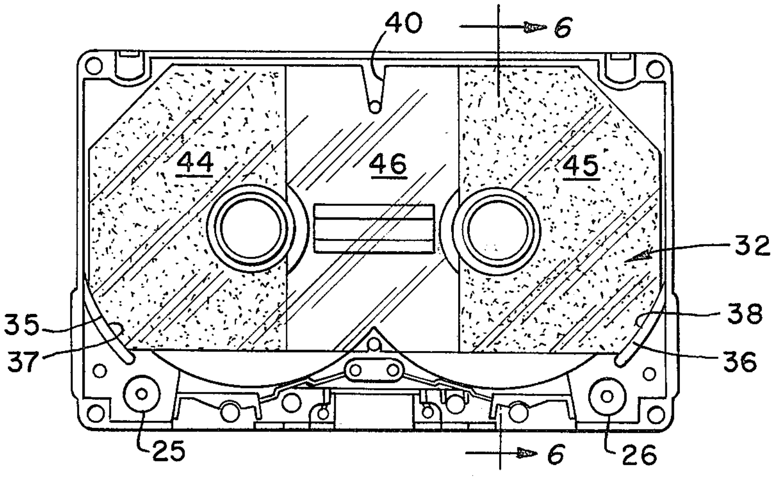
FIG. 5 is a view similar to FIG. 4, with the deflector plate in position in a housing portion of FIG. 4.
Figure 6:
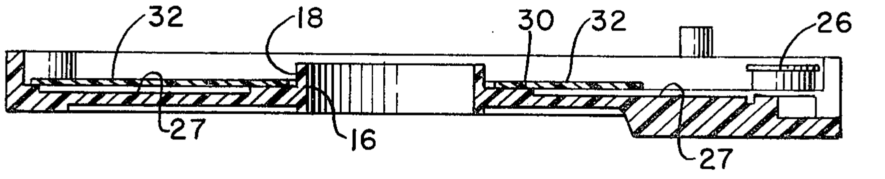
FIG. 6 is a greatly enlarged view in section taken along line 6—6 in FIG. 5.

In the drawings, wherein like reference numerals indicate like parts throughout the several views, a tape cassette C includes opposed, mating housing portions 10 and 11 held together by means of a plurality of suitable fasteners, such as screws S or the like, extended through opposite corners of one of the housing portions 10 into threaded openings 12 in the other housing portion 11.

The housing portions 10 and 11 have a conventional window opening 13 therein, with a suitable scale 14 adjacent the opening 13 to indicate the amount of tape T wound upon one spool or the other. Adjacent opposite ends of the window 13 the housing portions have aligned openings 15 and 16 therein, with an upstanding annular boss 17 and 18 surrounding the openings 15 and 16, respectively, and arranged in a conventional manner to cooperate with spools 19 and 20 to rotatably support the spools on the upstanding annular bosses 17 and 18 when the housing portions are assembled together, as in FIG. 1.

The spools have a plurality of radially inwardly directed teeth 21 and 22 therein, which cooperate with a suitable component of a tape playing and/or recording machine to turn the spools and cause the tape to move from one spool to the other in a conventional and well-known manner. In this connection, the housing portions include tape guide posts 23 and 24 and tape idler spools 25 and 26 adjacent opposite front corners thereof, and around which the tape is guided during its movement from one spool to the other when in use.

In accordance with the invention, each housing portion has a large, substantially figure eight shaped recess 27 formed therein, surrounding the spool mounting bosses 17 and 18 and of a size sufficient to underlie the tape T when it is fully wound upon one or the other of the spools 19 and 20. A shoulder 28 is thus formed surrounding the recess 27, and annular shoulders 29 and 30 surround the spool mounting bosses 17 and 18.

Resiliently yieldable, thin, flat tape deflector plates 31 and 32 are disposed in each housing portion against the inner surfaces thereof in overlying relationship to the recesses 27 in the housing portions, and the deflector plates have spaced openings 33 and 34 therethrough in alignment with the openings in the housing portions. The deflector plates 31 and 32 are sized to completely overlie the recesses 27 in the respective housing portions, and have opposite contoured corner portions 35 and 36 to cooperatively engage with upstanding, contoured bosses 37 and 38, respectively, in the housing portions to index the plates into proper position and aid in maintaining the plates in their proper position in the housing portions. Moreover, opposite, longitudinal side edges of the plates have notches 39 and 40 therein, which cooperate with indexing pins 41 and 42 in the housing portions to aid in indexing and maintaining the plates in their proper position in the housing portions. One of the notches or slots 40 is flared and has a snap opening 43 at the inner edge thereof, which is snap engaged with the indexing pin 42 in the respective housing portion.

If desired, the deflector plates may have opposite, opaque end portions 44 and 45 and a transparent center portion 46.

Figure 7:
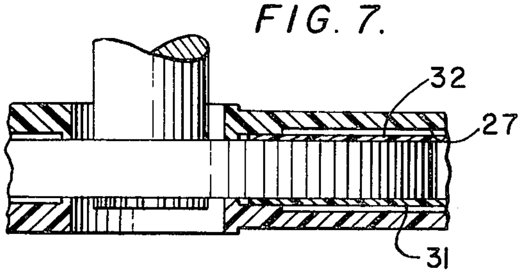
FIG. 7 is a greatly enlarged, fragmentary view in section of a portion of the cassette of the invention showing the recesses therein adjacent the spool on which the tape is wound, and depicting the manner in which the resiliently yieldable tape deflector plates engage opposite sides of the tape to urge it to wind accurately upon the spools.
Figure 8:
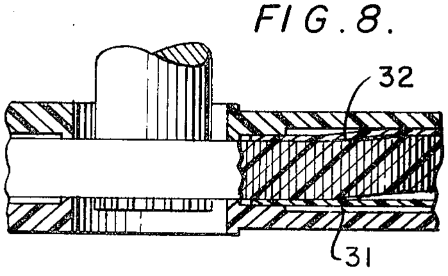
FIG. 8 is a view similar to FIG. 7, depicting the tape wound inaccurately upon one of the spools and engaged against one of the deflector plates, urging the deflector plate into the clearance space provided therefor.

Thus, with the present invention, the tape T is resiliently confined between a pair of resiliently yieldable tape deflector plates 31 and 32, which resiliently engage against opposite sides of the tape as it is wound or unwound from the spools, and thus the tape is urged into accurately wound relationship on the spools, as seen in FIG. 7, and in the event the tape overcomes the resilient urging of the plates and is inaccurately wound upon the spools, the plates are enabled to deflect into the spaces 27, as seen in FIG. 8, to therefore provide clearance for the tape and prevent binding of the tape in the housing portions.

Accordingly, an exceptionally simple and economical means is provided by the invention for preventing binding of tape in tape cassettes.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A tape cassette, including opposed, mating housing portions having means on the confronting inner surfaces thereof to rotatably support a pair of tape spools on which a recording tape is wound, said housing portions having recesses in the inner surfaces thereof of a size to substantially completely underlie the tape when the tape is wound on the spools and providing a lateral clearance space for the tape in the event the tape is inaccurately wound on the spools, to thus prevent binding of the tape in the housing portions, a deflector plate supporting shoulder on each housing portion extending around the recess and a deflector plate supporting shoulder on each housing portion surrounding each spool mounting means, and resiliently yieldable tape deflector plates carried by the housing portions between the tape and recesses and supported on the shoulders in overlying relationship to the recesses to engage opposite sides of the tape and thus urge the tape to wind accurately upon the spools.

2. A tape cassette as in claim 1, wherein the recess is substantially figure eight shaped.

3. A tape cassette as in claim 2, wherein the deflector plate has a transparent center section and opaque opposite end portions.

* * * * *